(12) United States Patent
Tokunaga et al.

(10) Patent No.: US 6,491,885 B1
(45) Date of Patent: Dec. 10, 2002

(54) EXHAUST GAS PROCESSING METHOD

(75) Inventors: Kikuo Tokunaga, Nagasaki-ken (JP); Nobuaki Murakami, Nagasaki-ken (JP); Toshiaki Ohkubo, Nagasaki-ken (JP); Shuya Nagayama, Nagasaki-ken (JP); Osamu Naito, Nagasaki-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/605,249

(22) Filed: Jun. 28, 2000

(51) Int. Cl.$^7$ ............................................... B01D 53/53
(52) U.S. Cl. .................... 423/212; 423/235; 423/239.1; 423/352
(58) Field of Search ................. 423/212, 235, 423/239.1, 352, 358

(56) References Cited

U.S. PATENT DOCUMENTS

| | | | | |
|---|---|---|---|---|
| 5,240,688 A | * | 8/1993 | von Harpe et al. | 423/235 |
| 5,431,893 A | | 7/1995 | Hug et al. | |
| 5,827,490 A | * | 10/1998 | Jones | 423/239.1 |
| 5,976,475 A | * | 11/1999 | Peter-hoblyn et al. | 423/212 |
| 6,093,380 A | * | 7/2000 | Iagana et al. | 423/239.1 |

FOREIGN PATENT DOCUMENTS

| | | |
|---|---|---|
| JP | 05015739 A | 1/1993 |
| JP | 6-7643 | 1/1994 |
| JP | 08281074 A | 10/1996 |

OTHER PUBLICATIONS

*Reaction Mechanism of Catalytic Reduction of NO by Urea*, T. Tachi et al., The Chemical Society of Japan, (8), 1992, pp. 812–816.

* cited by examiner

*Primary Examiner*—Stanley S. Silverman
*Assistant Examiner*—Maribel Medina
(74) *Attorney, Agent, or Firm*—Alston & Bird LLP

(57) ABSTRACT

An ammonia generating method characterized by generating ammonia by the contact hydrolysis of urea by contacting at 200° C. or more an aqueous solution of urea with a contact hydrolysis catalyst containing at least one selected from the group consisting of hydroxides, carbonates, and silicates of alkaline metals as the main component, and a combusted exhaust gas processing method using the ammonia generated by the method.

1 Claim, 4 Drawing Sheets

F I G. 1
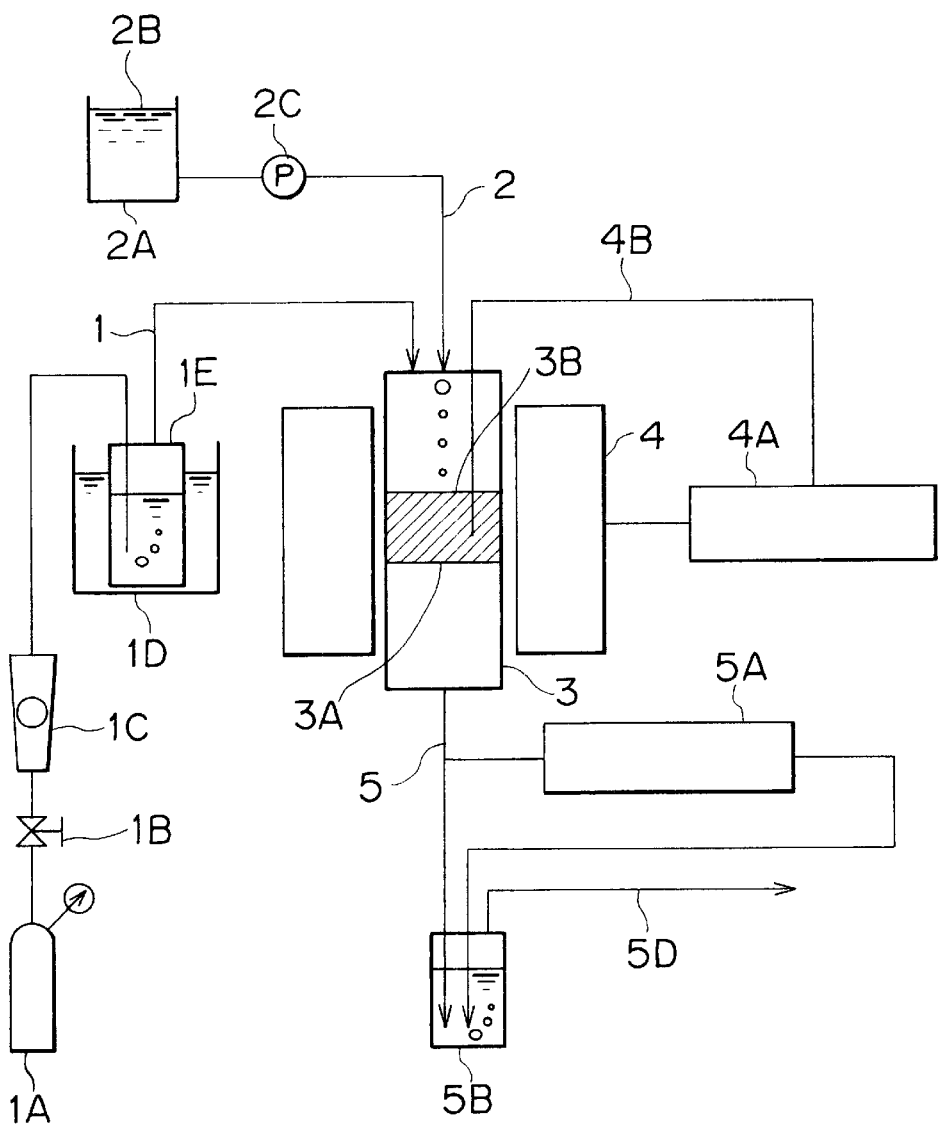

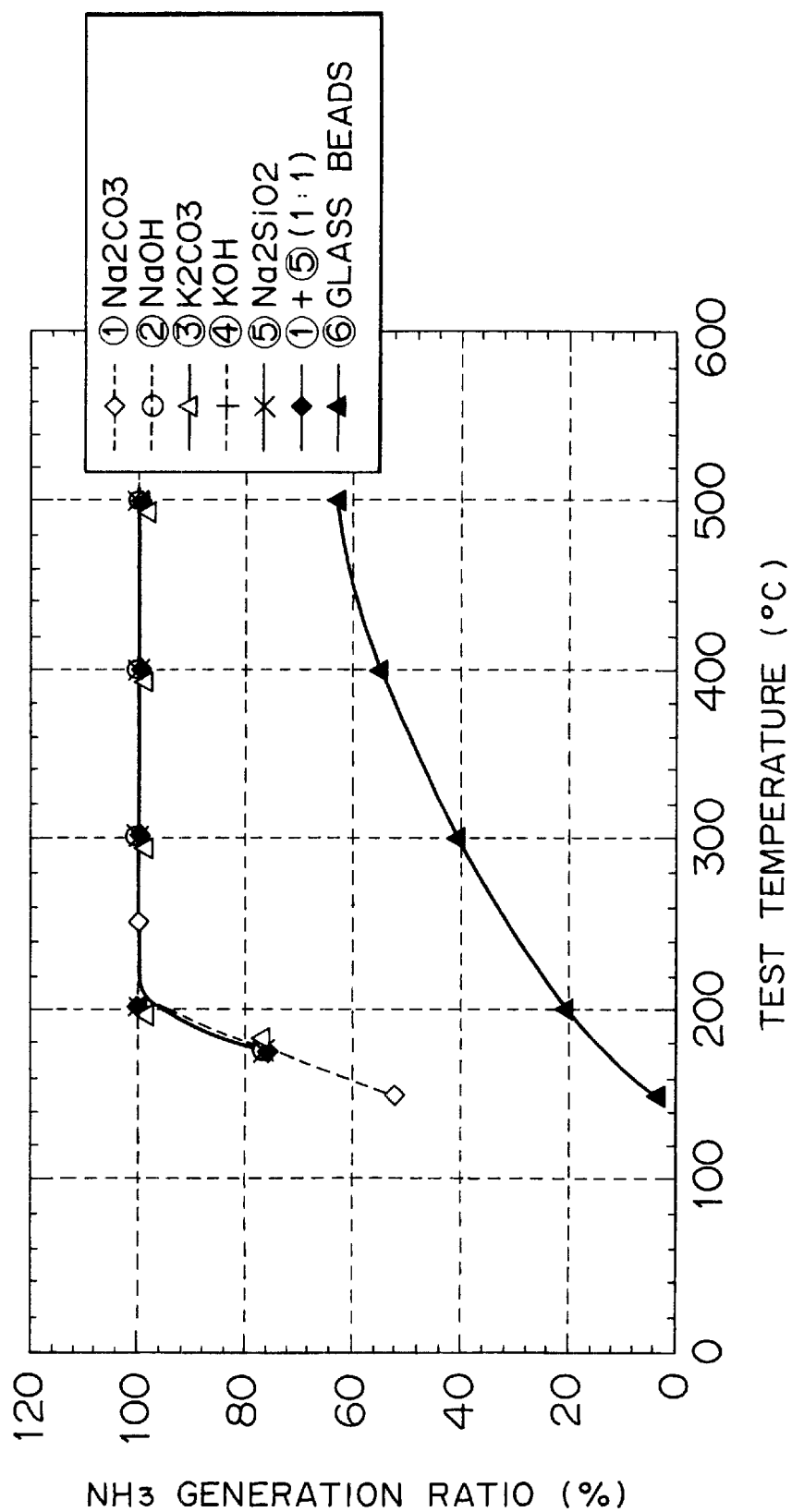

EXHAUST GAS PROCESSING METHOD

BACKGROUND OF THE INVENTION

Field of the Invention

The present invention relates to an ammonia generating method according to the contact hydrolysis of urea, and a combusted exhaust gas processing method using the same.

Nitrogen oxide in the exhaust smoke discharged from the thermal electric power plants, the automobiles, the various factories, or the like is one of the main causes of the photochemical smog. As an effective eliminating method therefor, the catalytic reduction method using ammonia ($NH_3$) as the reducing agent, has been used widely, mainly in the thermal electric power plants. Although liquid $NH_3$ is used in the thermal electric power plants for denitration, it is difficult to adopt liquid $NH_3$ in the denitration devices for public use, to be installed in a densely populated area. Therefore, a method of using a nitrogen compound such as urea as a safe and easily handled substitute reducing agent for generating $NH_3$ by the decomposition can be presented. A method of executing denitration by adding a substitute reducing agent such as urea directly to the exhaust gas flue can hardly be adopted to, in particular, the denitration at a low temperature of 400° C. or less due to problems such as the denitration reaction efficiency decline due to the poor decomposition efficiency to $NH_3$, and generation of scales derived from the substituent reducing agent inside the flue. Accordingly, a method of using a reducing agent decomposing device filled with the reducing agent decomposing catalyst for decomposing the reducing agent so as to generate $NH_3$, and using $NH_3$ for the denitration has been proposed (the official gazette of Japanese Patent Application Laid Open (JP-A) No. 5-15739).

According to the method, by contacting a reducing agent comprising a solid nitrogen-containing compound such as urea, cyanuric acid, melamine, and biuret, and a heated gas (such as air) containing water vapor with a metal oxide such as alumina, silica, silica-alumina, calcia, magnesia, and titania or a reducing agent decomposing catalyst such as zeolite, the solid reducing agent is thermally decomposed and/or hydrolyzed so as to generate ammonia. In order to promote the decomposition of the reducing agent, a catalyst with a strong solid basicity is effective. Therefor, two or more metal oxides can be used in a combination, or a component such as tungsten, vanadium, iron, molybdenum, copper, cobalt, tin, nickel, chromium, sulfur, magnesium, boron, barium, lanthanum, or the like can be added to the metal oxide. The reducing catalyst is used as a pellet shaped in a spherical shape, a hollow columnar shape, and a columnar shape. The temperature necessary for the decomposition of the reducing agent differs depending on the kind thereof and the kind of the decomposing catalyst, but in order to obtain the sufficient decomposition efficiency, in the case of the above-mentioned method, heat of 350 to 500° C. is necessary. As an example, in the case the reducing agent is urea, Japanese Patent Application Laid Open (JP-A) No. 5-15739 mentions that it is difficult to obtain $NH_3$ with a high efficiency without having the heat of the reducing agent decomposing catalyst of at least 350° C.

As mentioned above, in the case of using a metal oxide, or the like as the decomposition catalyst so as to decompose a solid reducing agent such as urea for generating $NH_3$, in order to convert the reducing agent to $NH_3$ highly efficiently, a high temperature of 350° C. or more is needed. Since the exhaust gas temperature from the outlet of an ordinary combusting device (boiler, diesel engine, or the like) to a nitration device is 200 to 450° C., it is in many cases difficult to maintain the temperature of the decomposing catalyst at 350° C. or more only by the exhaust gas temperature. In particular, at the time of starting, stopping, or a low load, the exhaust gas temperature is low, and thus it is difficult to maintain the decomposing catalyst temperature at 350° C. or more. Therefore, a reducing agent decomposing method capable of generating $NH_3$ at a lower temperature is desired.

SUMMARY OF THE INVENTION

The present invention is to solve the problems in the conventional technique and to provide an $NH_3$ generating method capable of executing the urea hydrolysis at a lower temperature efficiently and generating $NH_3$ at the flue exhaust gas temperature, and a combusted exhaust gas processing method using the same.

In order to solve the above-mentioned problems, the present invention adopts the following:

(1) An ammonia generating method which comprises generating ammonia by the contact hydrolysis of urea by contacting at 200° C. or more an aqueous solution of urea with a contact hydrolysis catalyst containing at least one selected from the group consisting of hydroxides, carbonates, and silicates of alkaline metals as the main component.

(2) The ammonia generating method according to the above-mentioned first aspect, wherein the contact hydrolysis catalyst is a contact hydrolysis catalyst containing at least one selected from the group consisting of solids of NaOH, KOH, $Na_2CO_3$, $K_2CO_3$, $Na_2SiO_3$ and $K_2SiO_3$ as the main component.

(3) The ammonia generating method according to the above-mentioned first or second aspect, wherein the contact temperature of the aqueous solution of the urea and the contact hydrolysis catalyst is 200 to 450° C.

(4) A combusted exhaust gas processing method for denitration by passage of a combusted exhaust gas in a denitration device using ammonia, which comprises installing a reducing agent decomposing reactor provided with a contact hydrolysis catalyst layer containing at least one selected from the group consisting of hydroxides, carbonates, and silicates of alkaline metals as the main component in the front flow of the denitration device disposed at a part with a 200 to 450° C. exhaust gas temperature in the flue, supplying an aqueous solution of urea to the reducing agent decomposing reactor for the contact hydrolysis, and adding the generated ammonia in the exhaust gas by the front flow of the denitration device for the denitration.

(5) A combusted exhaust gas processing method for denitration by passage of a combusted exhaust gas in a denitration device using ammonia, and adding ammonia for neutralizing sulfuric acid and sulfuric anhydride, which comprises installing a reducing agent decomposing reactor provided with a contact hydrolysis catalyst layer containing at least one selected from the group consisting of hydroxides, carbonates, and silicates of alkaline metals as the main component in the front flow of the denitration device disposed at a part with a 200 to 450° C. exhaust gas temperature in the flue, supplying an aqueous solution of urea to the reducing agent decomposing reactor for the contact hydrolysis, adding the generated ammonia in the exhaust gas by the front flow of the denitration device for the denitration, and introducing a part of the ammonia to a part with a 100 to 200° C. exhaust gas temperature in a back flow of the denitration device so as to be sprinkled in the exhaust gas for neutralizing the sulfuric acid and the sulfuric anhydride.

According to an ammonia generating method of the present invention, $NH_3$ can be generated from urea as an easily handled solid reducing agent further easily by a reaction at a relatively low temperature. The method is preferable as an $NH_3$ generating method in the exhaust gas process such as the exhaust smoke denitration or the neutralization of sulfuric acid or sulfuric anhydride in the exhaust smoke in a selective catalyst reduction with $NH_3$ as the reducing agent, and other processes requiring $NH_3$. According to the method, since $NH_3$ can be utilized without using hardly handled liquid ammonia, the risk of the environmental pollution can be avoided in the area close to the urban district. Moreover, according to an exhaust gas processing method of the present invention, the exhaust smoke denitration or the neutralization process of sulfuric acid and sulfuric anhydride in the exhaust smoke can be executed by the selective catalytic reduction without using liquid ammonia. Moreover, since the decomposing reaction of the urea can be executed at a low temperature of about 200° C., the exhaust gas heat can be utilized as the heat source for the reaction so that a heater needs to be used only when the exhaust gas has a low temperature at the time of starting or stopping the device or a low load drive, and thus it is an extremely efficient process.

BRIEF DESCRIPTION OF THE DRAWINGS

Hereinafter, an embodiment of the present invention will be explained specifically with reference to the drawings.

FIG. 1 is a system diagram of a test device for confirming the effects of an $NH_3$ generating method according to the present invention;

FIG. 4 is a graph showing the relationship between the test temperature of various kinds of catalysts and the $NH_3$ generation ratio in the $NH_3$ generation test from the urea aqueous solution of the examples.

DETAILED DESCRIPTION OF THE PREFERRED EMBODIMENT

Figure 2:
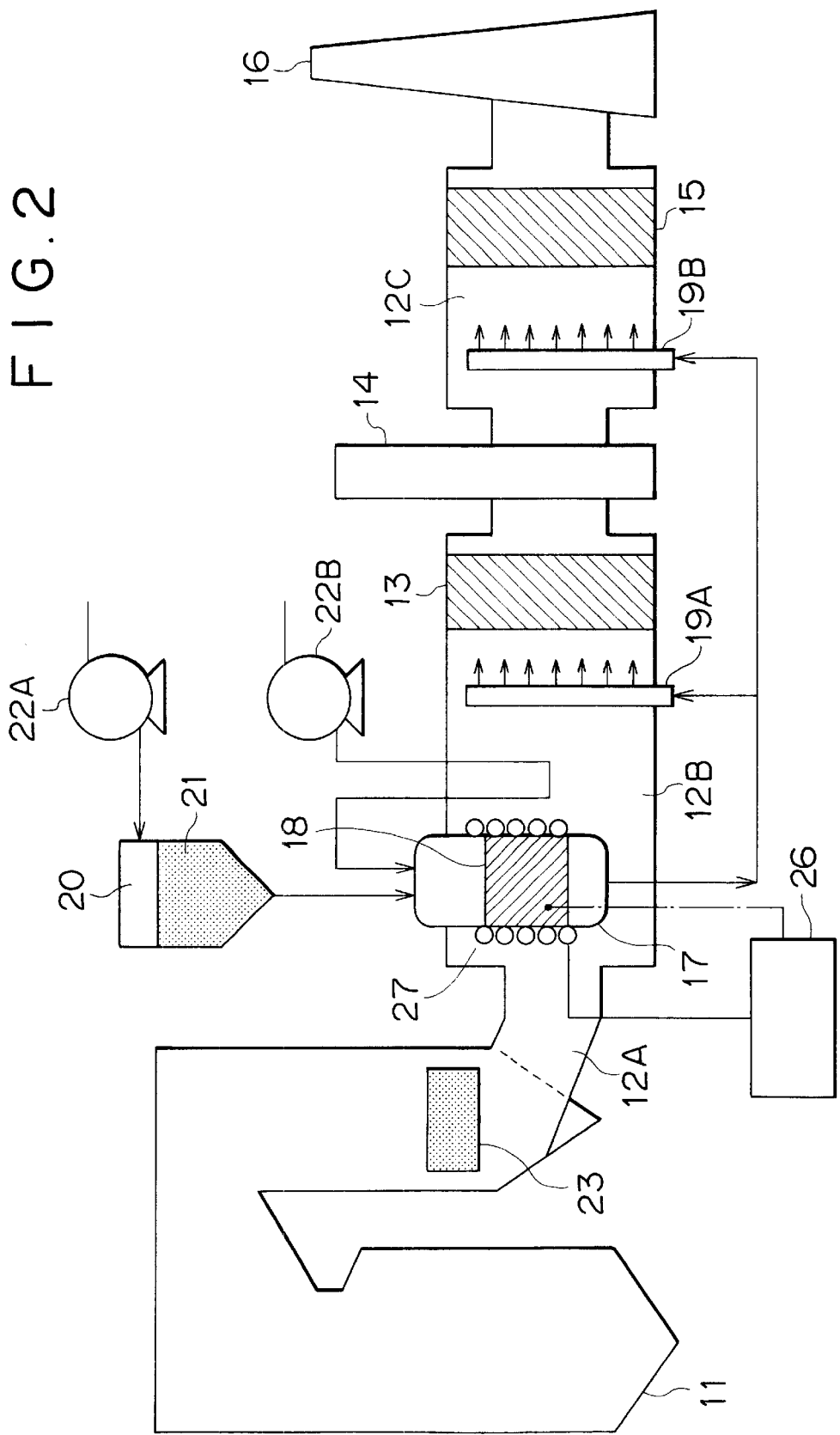
FIG. 2 is a system diagram showing an example of executing an exhaust smoke denitration and the neutralization of sulfuric acid in the exhaust smoke by adopting the $NH_3$ generating method according to the present invention in the exhaust gas process in a thermal electric power plant.

FIG. 2 is a system diagram of an example of the exhaust smoke denitration and neutralization of sulfuric acid in the exhaust smoke by adopting an $NH_3$ generating method according to the present invention in the exhaust gas process in a thermal electric power plant.

The denitration of the thermal electric power plant combustion boiler exhaust gas is executed between the fuel economizer outlet to the air preheater inlet, wherein the exhaust gas temperature is about 200 to 450° C., and the neutralization of the sulfuric acid in the exhaust smoke is executed in the back flow after the air preheater outlet, wherein the exhaust gas temperature is dropped to about 100 to 200° C. for the optimum use temperature of the denitration catalyst. In FIG. 2, $NH_3$ obtained by the $NH_3$ generating method according to the present invention is employed as $NH_3$ to be used for the denitration and the neutralization. In FIG. 2, an aqueous solution of a reducing agent (an aqueous solution of urea) 21 is stored in a reducing agent storage tank 20 and is conveyed by pressure by a pump 22A so as to be introduced into a reducing agent decomposing reactor 17 (it is also possible to install a liquid conveying pump between the reducing agent storage tank 20 and the reducing agent decomposing reactor 17 for introducing the aqueous solution of the reducing agent 21 to the reducing agent decomposing reactor 17 thereby).

A reducing agent decomposing catalyst layer 18 filled with a reducing agent decomposing catalyst is installed in the reducing agent decomposing reactor 17. Being heated by the exhaust gas flowing in a boiler flue 12A after the fuel economizer 23 outlet of a boiler 11, the reducing agent decomposing reactor 17 and the reducing agent decomposing catalyst layer 18 are always heated at 200° C. or more. Moreover, since a heater 27 is installed in the reducing agent reactor 17 so as to be driven by a signal from a temperature adjuster 26 in the case the exhaust gas temperature is low, for example, at the time of starting, stopping or a low load for heating the reducing agent decomposing reactor 17, the decomposing catalyst temperature can be maintained at the reducing agent decomposing reaction temperature or more. The aqueous solution of the reducing agent 21 is supplied to the reducing agent decomposing reactor 17 in the higher temperature state with respect to the reducing agent storage tank 20 so that the water content is evaporated, and the molten urea (melting temperature: 132° C.) is contacted with the high temperature reducing agent catalyst layer 18 so as to be hydrolyzed, and $NH_3$, $CO_2$ and water vapor are generated.

As the reducing agent decomposing catalyst, a catalyst having at least one selected from the group consisting of hydroxides, carbonates, and silicates of alkaline metals as the active component is used. In particular, a catalyst having at least one selected from the group consisting of solids of $NaOH$, $KOH$, $Na_2CO_3$, $K_2CO_3$, $Na_2SiO_3$ and $K_2SiO_3$ as the active component is preferable. Since these catalysts apply a sufficient strength, they are used preferably being carried by a ceramic carrier such as silica, alumina, silica-alumina, glass, and pottery frit. In general, they are used after being shaped in a spherical, hollow columnar, or columnar pellet-like shape, or in a honeycomb-like shape.

After preheated by the exhaust gas, the air sent out from an air supply pump 22B is introduced into the reducing agent decomposing reactor 17 so as to convey the generated $NH_3$, $CO_2$ and water vapor to $NH_3$ sprinklers 19A and 19B comprising a large number of blowing out nozzles, installed inside a flue 12B. Among $NH_3$, $CO_2$ and water vapor sprinkled in the flue 12B by the $NH_3$ sprinkler 19A comprising a large number of blowing out nozzles upstream of the air preheater 14, $NH_3$ denitrates nitrogen oxides contained in the exhaust gas by the catalyst reduction at a denitration catalyst layer 13. Moreover, among $NH_3$, $CO_2$ and water vapor sprinkled in the flue 12C by the $NH_3$ sprinkler 19B comprising a large number of blowing out nozzles downstream of the air preheater 14, $NH_3$ executes the neutralization reaction of sulfuric anhydride and sulfuric acid contained in the exhaust gas during the air flow mixture in the flue 12C for providing the anticorrosion and protection effects for an electric dust collector (EP) 15. The ammonium sulfate generated at the time and fine powders generated at the time of the boiler combustion are dedusted at the electric dust collector (EP) 15.

In the process with the configuration, after heating the reducing agent decomposing reactor 17, $NH_3$ from the $NH_3$ sprinkler 19A is injected to the exhaust gas from the boiler 11, and the denitration process is applied thereto in the denitration catalyst layer 13. $NH_3$ from the $NH_3$ sprinkler 19B is again injected to the denitrated exhaust gas in the back flow of the air preheater 14 for neutralizing the sulfuric anhydride and sulfuric acid. It is discharged from a chimney 16 via the air dust collector 15.

Figure 3:
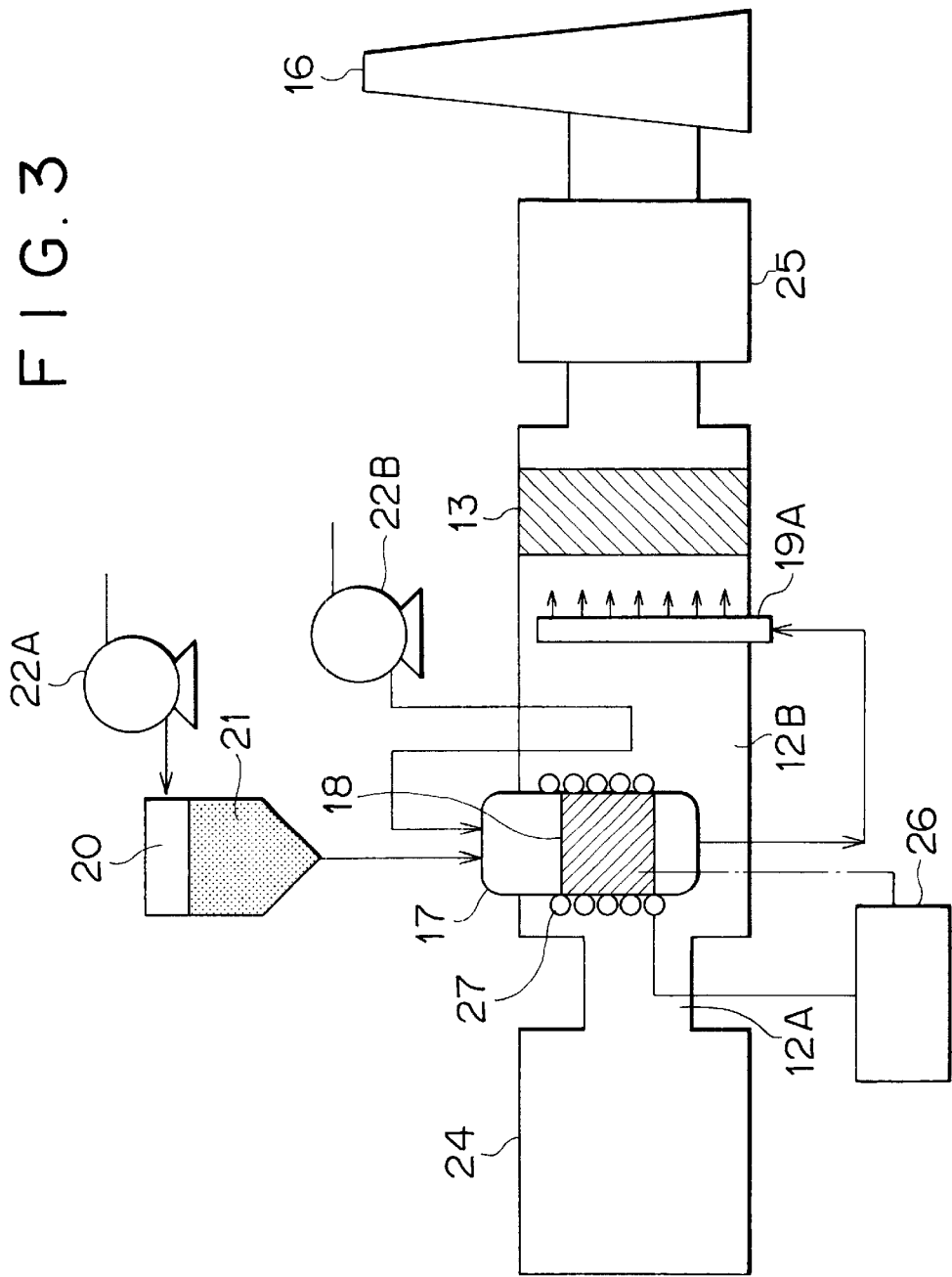
FIG. 3 is a system diagram showing an example of executing an exhaust smoke denitration by adopting the $NH_3$ generating method according to the present invention in processing the exhaust gas from an exhaust gas generating source in a co-generation plant.

FIG. 3 is a system diagram of an example of the exhaust smoke denitration by adopting an $NH_3$ generating method according to the present invention in the exhaust gas process in an exhaust gas generating source (diesel engine or gas turbine) of a co-generation plant. In FIG. 3, the same elements as in FIG. 2 are applied with the same numerals and further explanation is not provided In the process with the configuration, after heating the reducing agent decomposing reactor 17, $NH_3$ from the $NH_3$ sprinkler 19 is injected to the exhaust gas from the exhaust gas generating source 24, and the denitration process is applied thereto in the denitration catalyst layer 13. After collecting the waste heat by a waste heat collecting boiler 25, the denitrated exhaust gas is discharged from the chimney 16.

The urea as the reducing agent reacts on the hydrolysis catalyst surface at a high temperature so as to execute the contact thermal decomposition according to the formula (1). Furthermore, isocyanic acid (HNCO) generated by the thermal decomposition reacts with water on the catalyst surface in the case water vapor exists so as to be hydrolyzed and converted to $NH_3$ and $CO_2$ according to the formula (2). In the case the catalyst temperature is as high as 400° C. or more, the urea reacts with $H_2O$ on the catalyst surface so as to be hydrolyzed to $NH_3$ and $CO_2$ according to the formula (3).

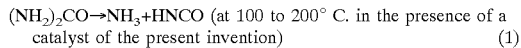

$(NH_2)_2CO \rightarrow NH_3 + HNCO$ (at 100 to 200° C. in the presence of a catalyst of the present invention) (1)

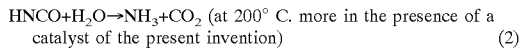

$HNCO + H_2O \rightarrow NH_3 + CO_2$ (at 200° C. more in the presence of a catalyst of the present invention) (2)

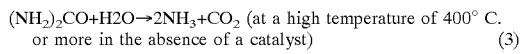

$(NH_2)_2CO + H2O \rightarrow 2NH_3 + CO_2$ (at a high temperature of 400° C. or more in the absence of a catalyst) (3)

In the present invention, since a contact hydrolysis catalyst containing at least one selected from the group consisting of hydroxides, carbonates, and silicates of alkaline metals such as solids of NaOH, KOH, $Na_2CO_3$, $K_2CO_3$, $Na_2SiO_3$ and $K_2SiO_3$ as the main component is used, the 100% conversion ratio to $NH_3$ can be obtained even at a relatively low temperature of 200° C. as shown in FIG. 4 later described. At the time, the reactions of formulae (1) and (2) take place consecutively on the decomposing catalyst surface.

In the case the $NH_3$ accordingly obtained is added and mixed in the exhaust gas at 200 to 450° C., the denitration reaction as the following formulae takes place in the denitration catalyst layer so as to be denitrated.

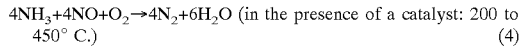

$4NH_3 + 4NO + O_2 \rightarrow 4N_2 + 6H_2O$ (in the presence of a catalyst: 200 to 450° C.) (4)

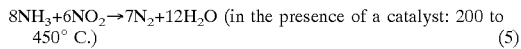

$8NH_3 + 6NO_2 \rightarrow 7N_2 + 12H_2O$ (in the presence of a catalyst: 200 to 450° C.) (5)

Moreover, in the case it is added and mixed in the flue exhaust gas with a 100 to 200° C. exhaust gas temperature, the neutralization reaction as the following formulae takes place so as to neutralize sulfuric acid and sulfuric anhydride.

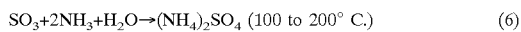

$SO_3 + 2NH_3 + H_2O \rightarrow (NH_4)_2SO_4$ (100 to 200° C.) (6)

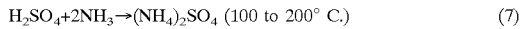

$H_2SO_4 + 2NH_3 \rightarrow (NH_4)_2SO_4$ (100 to 200° C.) (7)

WORKING EXAMPLES

Hereinafter the effects of the present invention will be explained specifically based on the examples. FIG. 1 is a system diagram of a test apparatus produced in order to confirm the effects of the $NH_3$ generating method of the present invention. A carrier gas is introduced into a reactor 3 from an air bomb 1A via a valve 1B after passing through a humidifier 1E with the temperature adjusted by a flow meter 1C and a thermostat 1D. Moreover, an aqueous solution of urea 2B as the reducing agent stored in a tank 2A is introduced into the reactor 3 through a quantitative pump 2C. The reactor 3 is filled with a catalyst layer 3B, with the temperature of the catalyst layer 3B maintained constantly by an electric furnace 4 covering the outer periphery of the reactor 3, a thermocouple 4B and a temperature adjuster 4A.

The aqueous solution of the urea 2B supplied from a urea supply line 2 is hydrolyzed by the catalyst layer 3B so as to be converted to $NH_3$, $CO_2$ and water vapor. Generated $NH_3$, $CO_2$ and water vapor are conveyed to a test gas line 5 by the carrier gas supplied from the gas supply line 1. A part of the gas conveyed to the test gas line 5 is introduced into a gas analyzer 5A so that the $NH_3$ generation ratio from the urea in the reactor 3 can be measured by counting the $NH_3$ component concentration. Then, the gas after the test is applied with the exhaust gas process in a gas absorbing bottle 5B so as to be discharged to the outside from an exhausting line 5D.

According to the above-mentioned method, the $NH_3$ generation test from the aqueous solution of the urea is executed with the condition shown in Table 1. The test results are shown in Table 2 and FIG. 4. From the test results, it is leaned that the lowest temperature capable of converting the urea as the reducing agent to $NH_3$ with a high efficiency is 200° C. in the case solid $Na_2CO_3$, NaOH, $K_2CO_3$, KOH, $Na_2SiO_3$ or a mixture thereof is used as the urea decomposing catalyst, that is, $NH_3$ can be generated with a high efficiency from an aqueous solution of urea with a 200° C. or more temperature. Although glass beads were used as a decomposing catalyst carrier in this test, the other carriers. such as those made of ceramics can be used, and the similar results were obtained. In FIG. 4, (1) to (5) and (1)+(5) are the substantially same curves.

TABLE 1

| test condition | |
|---|---|
| Reactor | 25 mm diameter, 2 mm thickness, 600 mm length magnetic pipe |
| Test gas flow rate | 2.0 Nl/minute |
| Urea aqueous solution concentration | 1.0 wt % |
| Urea aqueous solution flow rate | 1.0 g/minute |
| Test temperature | 150 to 400° C. |
| Test gas water content | 10 wt % (thermostat temperature: 45.5° C.) |
| catalyst layer | 2.5 mm particle size particles, 100 ml filling |
| $NH_3$ analysis method | Nessler's color comparison analysis method |
| | Absorbing material . . . boron 1% solution |
| Catalyst carrying method | 2.5 mm particle size glass beads soaked in a saturated aqueous solution of a catalyst ($Na_2CO_3$, NaOH, $K_2CO_3$, KOH, $Na_2SiO_3$) for 10 minutes, dried for a whole one day after eliminating water, and dried at 120° C. for 2 hours were used. |

TABLE 2

NH$_3$ generating test results

| Reaction condition | | Test results (%) | |
|---|---|---|---|
| Decomposing catalyst | Test temperature (%) | NH$_3$ generation ratio | Note Test number |
| (1) Na$_2$Co$_3$ | 150 | 52.0 | Example 1 |
| | 175 | 75.2 | Example 2 |
| | 200 | 100.1 | Example 3 |
| | 250 | 99.9 | Example 4 |
| | 300 | 100.0 | Example 5 |
| | 400 | 99.9 | Example 6 |
| | 500 | 99.9 | Example 7 |
| (2) NaOH | 175 | 76.3 | Example 8 |
| | 200 | 99.8 | Example 9 |
| | 300 | 100.1 | Example 10 |
| | 400 | 99.9 | Example 11 |
| | 500 | 100 | Example 12 |
| (3) K$_2$CO$_3$ | 175 | 76 | Example 13 |
| | 200 | 99.9 | Example 14 |
| | 300 | 100 | Example 15 |
| | 400 | 99.8 | Example 16 |
| | 500 | 100 | Example 17 |
| (4) KOH | 175 | 76.5 | Example 18 |
| | 200 | 99.8 | Example 19 |
| | 300 | 99.9 | Example 20 |
| | 400 | 100 | Example 21 |
| | 500 | 100.1 | Example 22 |
| (5) Na$_2$SiO$_3$ | 175 | 74.9 | Example 23 |
| | 200 | 99.8 | Example 24 |
| | 300 | 100.1 | Example 25 |
| | 400 | 100 | Example 26 |
| | 500 | 99.8 | Example 27 |
| (1) Na$_2$CO$_3$ + (5) Na$_2$SiO$_3$ | 175 | 75 | Example 28 |
| | 200 | 99.8 | Example 29 |
| | 300 | 100 | Example 30 |
| | 400 | 99.8 | Example 31 |
| | 500 | 100 | Example 32 |
| (6) glass beads | 150 | 3.4 | Comparative example 1 |
| | 200 | 21.3 | Comparative example 2 |
| | 300 | 40.6 | Comparative example 3 |
| | 400 | 56.1 | Comparative example 4 |
| | 500 | 62.5 | Comparative example 5 |

The disclosure of Japanese Patent Application No.9-335520 filed on Dec. 5, 1997 including specification, claims, drawings, and summary are incorporated herein by reference with its entirety.

What is claimed is:

1. A combusted exhaust gas processing method for denitration by passage of a combusted exhaust gas in a denitration device using ammonia, and adding ammonia for neutralizing sulfuric acid and sulfuric anhydride, which comprises installing a reducing agent decomposing reactor provided with a contact hydrolysis catalyst layer containing at least one catalyst selected from the group consisting of carbonates and silicates of alkaline metals as a main component in the front flow of the denitration device disposed at a part with a 200 to 450° C. exhaust gas temperature in a flue, supplying an aqueous solution of urea to the reducing agent decomposing reactor for the contact hydrolysis to generate ammonia, adding the generated ammonia in the exhaust gas by the front flow of the denitration device for the denitration, and introducing a part of the ammonia to a part with a 100 to 200° C. exhaust gas temperature in a back flow of the denitration device so as to be sprinkled in the exhaust gas for neutralizing the sulfuric acid and the sulfuric anhydride.

* * * * *